United States Patent
Ramnarain et al.

(10) Patent No.: US 9,440,801 B1
(45) Date of Patent: Sep. 13, 2016

(54) MECHANISM FOR ORIENTING PACKAGING ELEMENTS SUCH AS CONTAINER CAPS

(71) Applicants: David R. Ramnarain, Shakopee, MN (US); Brian D. Ramnarain, Shakopee, MN (US); Christopher D. Ramnarain, Shakopee, MN (US)

(72) Inventors: David R. Ramnarain, Shakopee, MN (US); Brian D. Ramnarain, Shakopee, MN (US); Christopher D. Ramnarain, Shakopee, MN (US)

(*) Notice: Subject to any disclaimer, the term of this patent is extended or adjusted under 35 U.S.C. 154(b) by 0 days.

(21) Appl. No.: 14/686,903

(22) Filed: Apr. 15, 2015

(51) Int. Cl.
*B65G 17/16* (2006.01)
*B65G 29/02* (2006.01)
*B65G 47/12* (2006.01)
*B65G 47/256* (2006.01)

(52) U.S. Cl.
CPC .................... *B65G 47/256* (2013.01)

(58) Field of Classification Search
CPC ...... B65G 17/16; B65G 29/02; B65G 47/12; B65G 47/846
USPC ....... 198/384, 389, 390, 393, 394, 395, 396, 198/397.01
See application file for complete search history.

(56) References Cited

U.S. PATENT DOCUMENTS

| | | | | | |
|---|---|---|---|---|---|
| 3,710,920 A | * | 1/1973 | Sterling | ............... | B67B 3/0645 198/380 |
| 4,093,062 A | * | 6/1978 | Sjogren | ............. | B65G 47/1457 198/380 |
| 5,826,697 A | * | 10/1998 | Mochizuki | ......... | B65G 47/1457 198/392 |
| 5,996,768 A | * | 12/1999 | Boyce | ............... | B65G 47/1471 198/397.01 |
| 6,019,212 A | * | 2/2000 | Takahashi | ............ | H05K 13/028 198/392 |
| 6,204,464 B1 | * | 3/2001 | Garcia | ................... | B07C 5/344 209/574 |
| 7,350,638 B2 | * | 4/2008 | Ramnarain | .......... | B67B 3/0645 198/380 |
| 7,527,140 B2 | * | 5/2009 | Kodera | ............. | B65G 47/1457 198/391 |
| 7,861,846 B1 | * | 1/2011 | Salditch | ............ | B65G 47/1457 198/392 |
| 8,733,535 B2 | * | 5/2014 | Garcia | ............... | B65G 47/1471 198/396 |
| 8,875,867 B2 | * | 11/2014 | Ronchi | ............. | B65G 47/1457 198/382 |
| 8,925,708 B2 | * | 1/2015 | Cie likowski | ....... | A24D 3/0216 198/397.02 |
| 9,022,841 B2 | * | 5/2015 | Martin | .................... | G07D 3/00 198/550.01 |
| 9,096,390 B2 | * | 8/2015 | Ackley | ..................... | B07C 5/00 |

* cited by examiner

*Primary Examiner* — Douglas Hess
(74) *Attorney, Agent, or Firm* — Nikolai & Mersereau, PA; Thomas J. Nikolai

(57) ABSTRACT

Bottle caps are properly oriented and deposited into a bottle capping machine by an apparatus having a rotating disk which carries caps from a cap receptacle through a sorting zone to a discharge zone. In the sorting zone, improperly oriented caps fall from the disk back into the cap receptacle. Only properly oriented caps are moved by the rotating disk to the discharge zone where such caps are discharged by a discharge plate into the bottle capping machine.

12 Claims, 8 Drawing Sheets

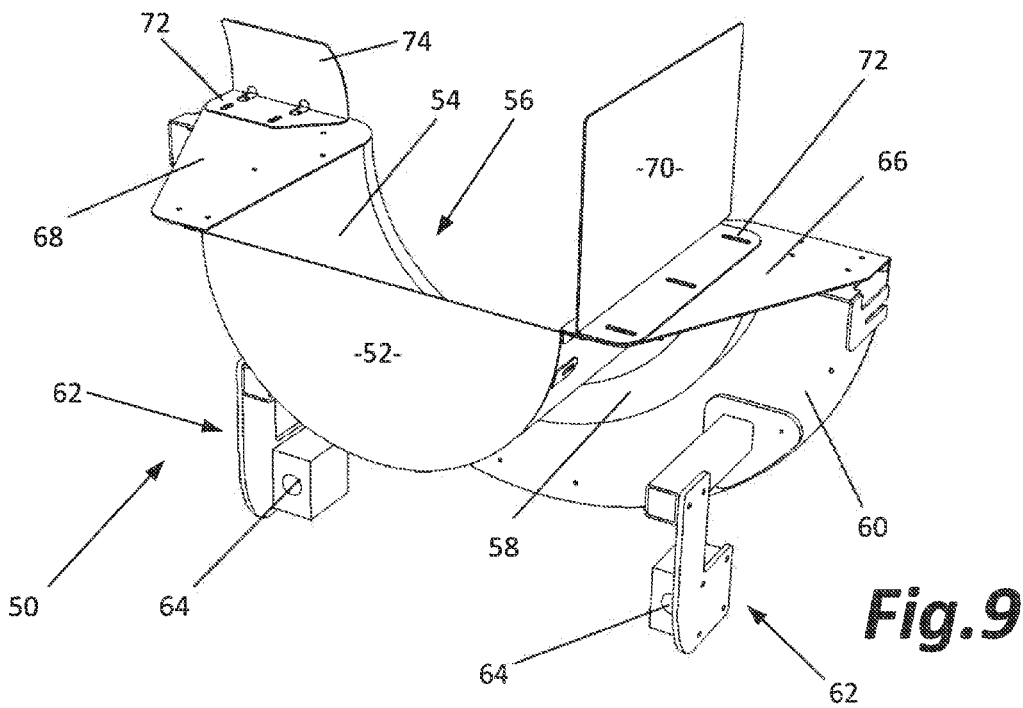
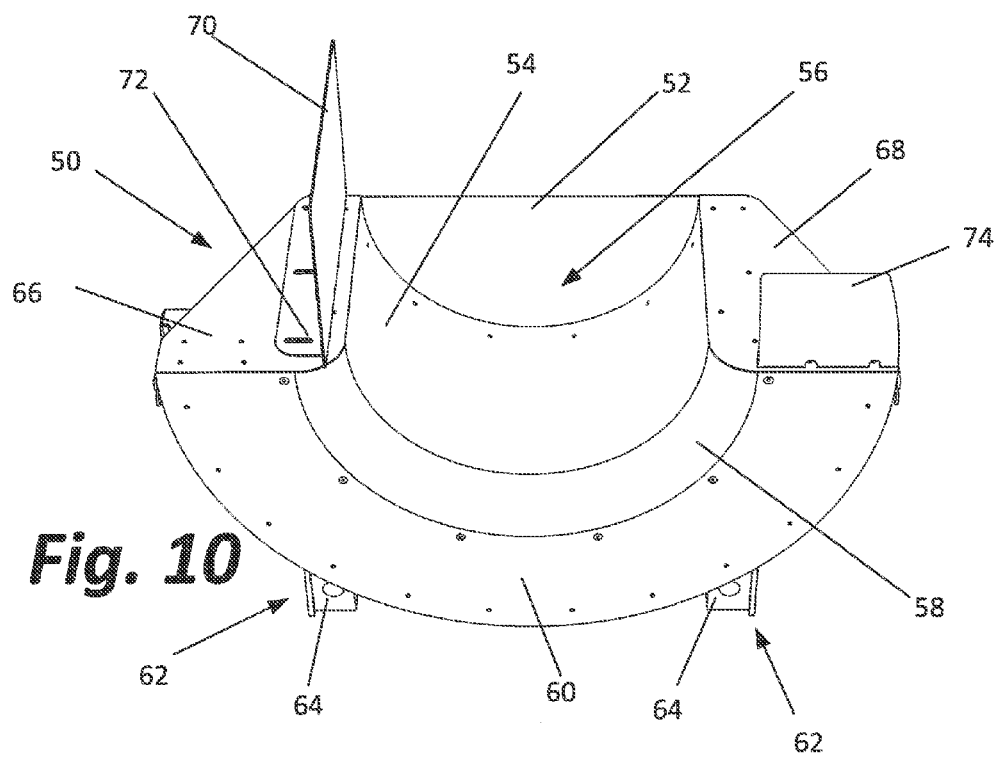

MECHANISM FOR ORIENTING PACKAGING ELEMENTS SUCH AS CONTAINER CAPS

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention concerns automated bottling equipment. More specifically, the present invention relates to equipment used to orient container caps so the caps may be automatically coupled to a container after the container is filled.

II. Related Art

Millions of containers, and more specifically bottles, are filled each day with water, soda, other beverages, other liquids, gases and other fluidic materials such as powders. Such bottles are typically sealed, after being filled, with a cap. This, of course, requires the cap be properly oriented and then coupled to the container.

Most bottling operations are already automated. However, there currently exists a real problem in orienting bottle and other container caps so the capping equipment can automatically apply a cap to the container to seal the container. Specifically, if a cap enters the capping station upside down or even at some other unacceptable angle, the automated equipment is incapable of coupling the cap to a bottle. This results in unsuccessful capping of bottles and, often, jamming of the bottling and capping equipment. Thus, there is a real need for a cap alignment mechanism that makes certain that every cap entering the capping station is correctly aligned for application to a container to be sealed.

SUMMARY OF THE INVENTION

Correct alignment of bottle caps is provided by a machine which includes a housing, an alignment disk mounted for rotation within the housing, a cap receptacle mounted to the housing and adapted to funnel randomly aligned caps toward the alignment disk, and a discharge plate also mounted to the housing.

The alignment disk has a cap engagement surface comprising an inner disk member and an outer disk member joined together and offset from each other by a cap support ledge. A plurality of flights are secured to and equally spaced about the outer disk member such that pockets are formed between adjacent pairs of said plurality of flights and the portion of the cap support ledge extending therebetween. The size of each pocket (i.e., the distance between each adjacent pair of flights) is greater than the diameter of the caps to be oriented. This permits caps to enter the pockets. The pocket size is less than twice the diameter of the caps to prevent more than one cap from residing in a pocket in any one time and the resulting jamming that could otherwise occur. Extending radially across the inner disk member is a plurality of paddles.

The mechanism also includes a means for rotating the alignment disk. This may include a handle allowing the disk to be turned manually. In most cases, this means will be a motor coupled to a center hole in the alignment disk by an axle, pin or the like. The axis of rotation of the disk is angled from the horizontal such that the alignment disk tips back from the vertical from top to bottom.

As the alignment disk rotates, the flights and pockets pass through a loading zone adjacent the cap receptacle, an elevator zone in which caps, finding their way into the pockets, are transported upwardly, a sorting zone near the top where properly oriented caps are retained in the pockets and all other caps drop from the pockets back into the cap receptacle, and a discharge zone where the properly oriented caps are removed from the pockets by the discharge plate and deposited in the proper orientation into a capping machine. As caps drop from the sorting zone to the cap receptacle, they come into contact with one or more of the paddles causing the caps to tumble as they fall.

BRIEF DESCRIPTION OF THE DRAWINGS

The foregoing features, objects and advantages of the invention will become apparent to those skilled in the art from the following detailed description and with reference to the following drawings in which like numerals and the several views refer to corresponding parts.

FIG. 9 is a first perspective view of the cap receptacle of the machine shown in FIG. 1.

FIG. 10 is a second perspective view of the cap receptacle shown in FIG. 9.

DETAILED DESCRIPTION

Figure 1:
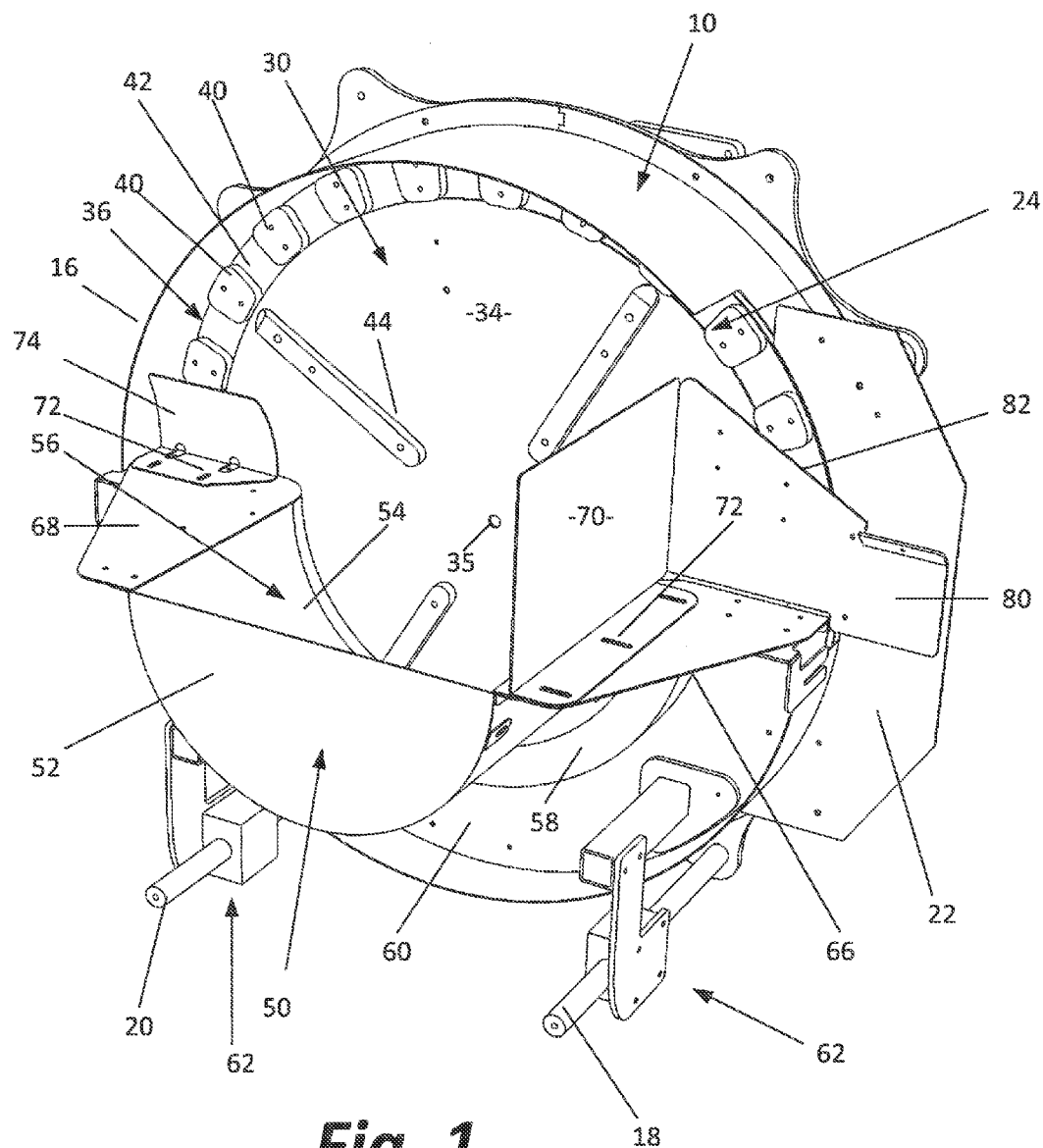
FIG. 1 is a perspective view of a machine for orienting container caps.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

Figure 2:
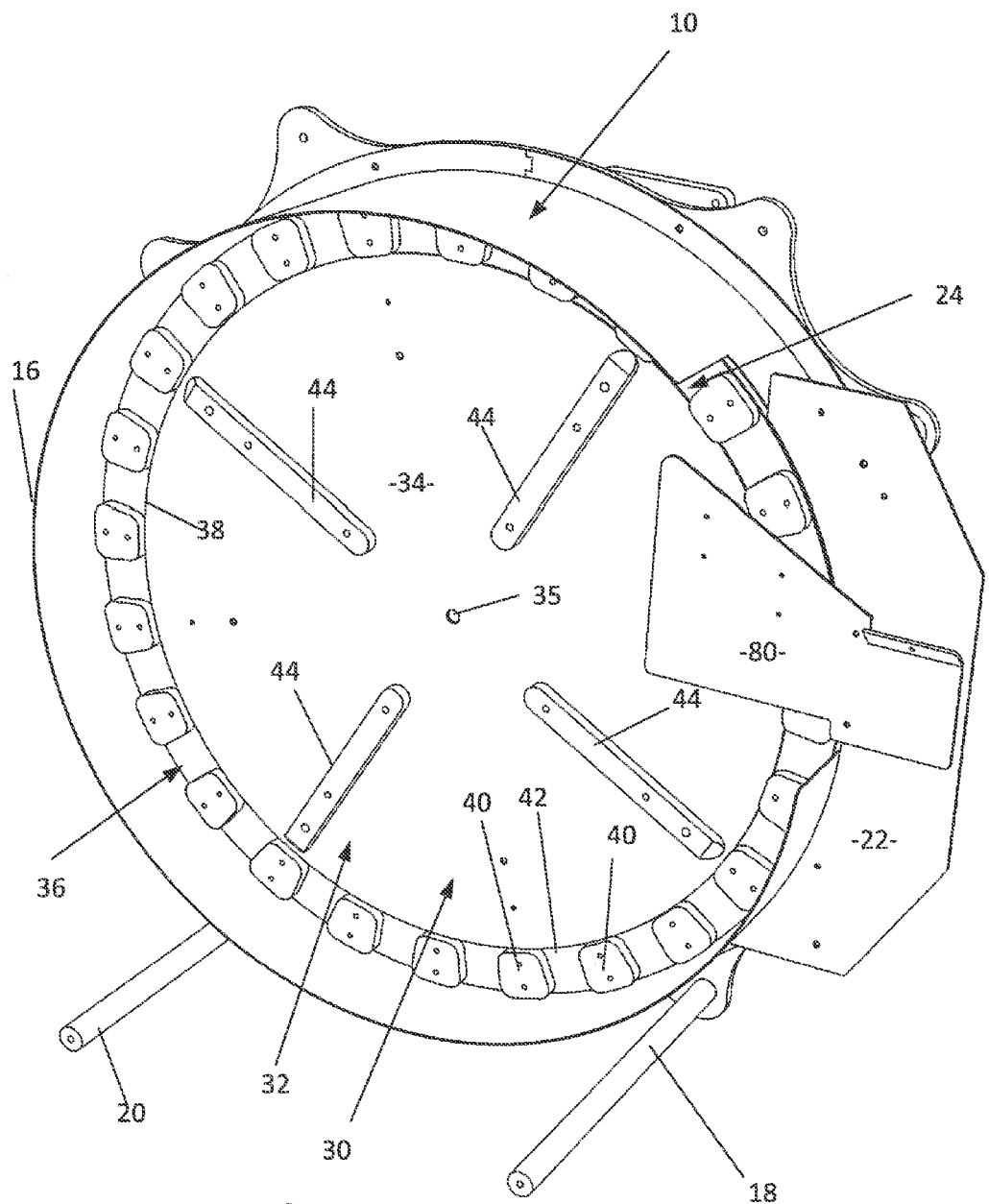
FIG. 2 is a perspective view of the machine shown in FIG. 1 with the cap receptacle removed.
Figure 3:
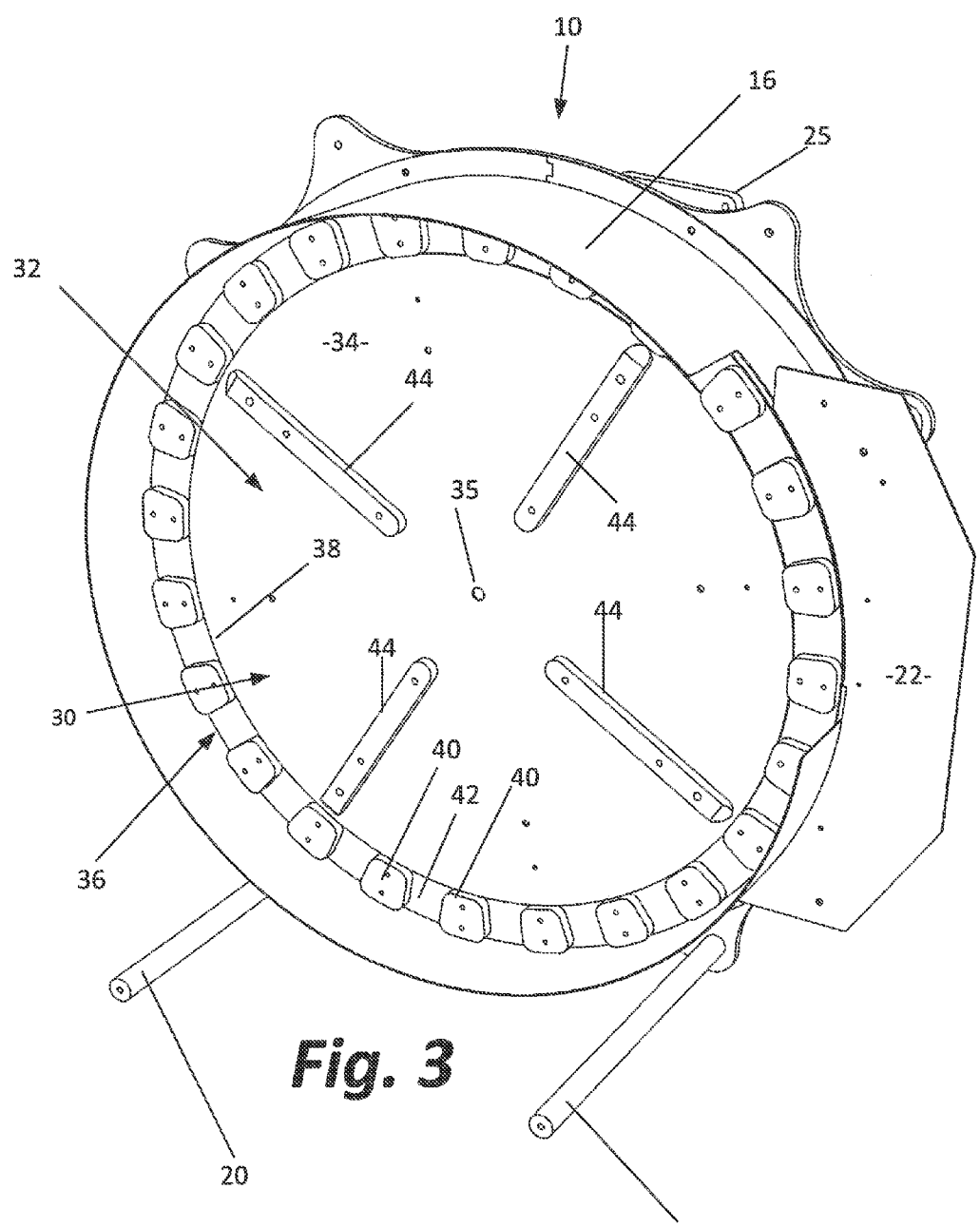
FIG. 3 is a perspective view of the machine shown in FIG. 1 with both the cap receptacle and the discharge plate removed.

One example of a machine for aligning or orienting bottle caps and depositing the bottle caps in a capping machine (not shown) is illustrated in FIG. 1. The machine has a housing 10, a rotating alignment disk assembly 30, a cap receptacle 50 and a discharge plate 80. This same machine is shown in FIG. 2 with the cap receptacle 50 removed and in FIG. 3 with both the cap receptacle 50 discharge plate 80 removed.

Figure 4:
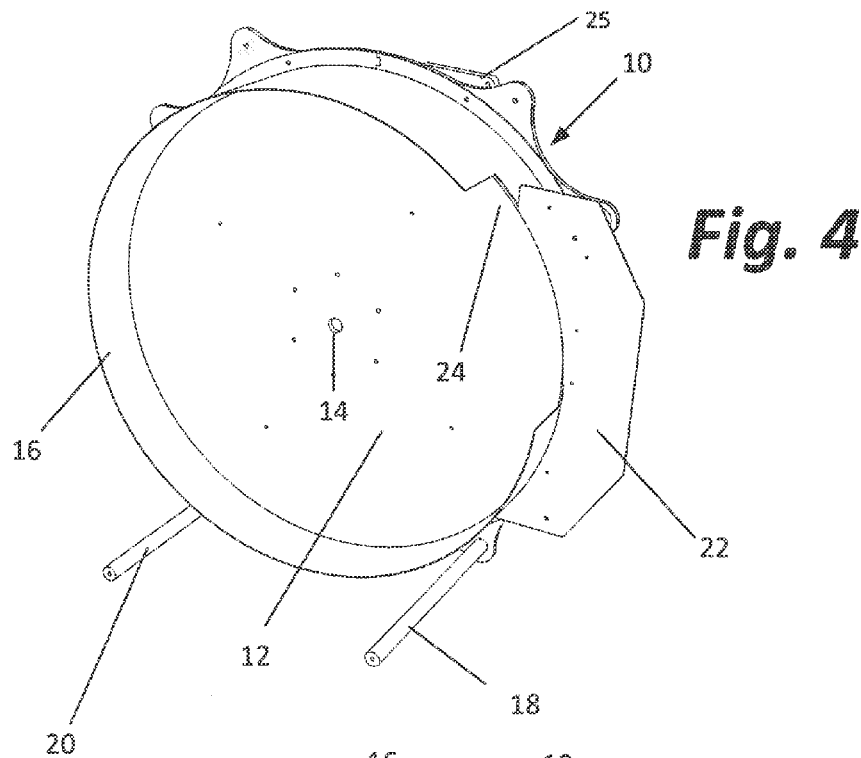
FIG. 4 is a perspective view of the housing of the machine shown in FIG. 1.
Figure 5:
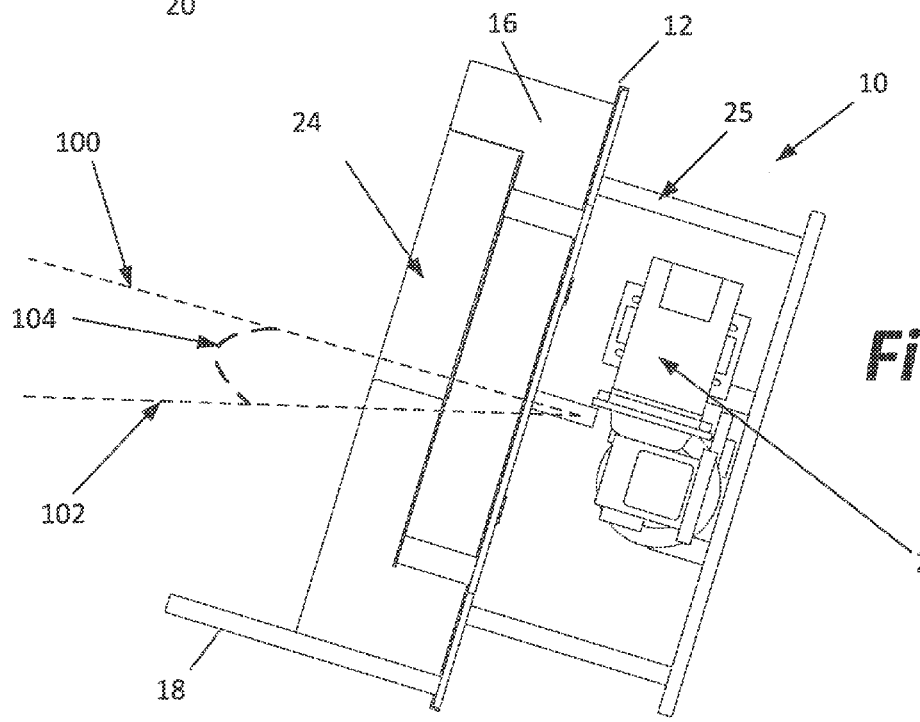
FIG. 5 is a side view of the housing of the machine shown in FIG. 1.

The construction of the housing 10 is perhaps best illustrated in FIGS. 4 and 5. As shown in FIG. 4, the housing 10 includes a base 12 having a center hole 14 extending through the base 12. Extending forward from the peripheral edge of the base 12 is a side wall 16. Also extending forward from the bottom of the base 12 is a pair of cap receptacle support rails 18 and 20. A mounting plate 22 extends outwardly from base 12 proximate an opening 24 in the side wall 16. As best shown in FIG. 5, mounted behind the base 12 is a frame 25 carrying a motor 26. The motor 26 turns a shaft (not shown) which passes through the hole 14 in the base 12. The shaft is also coupled to the rotating alignment disk assembly 30. In the embodiment shown, it is this shaft and motor 26 which rotate disk assembly 30. Those skilled in the art will recognize the disk assembly may be rotated in any number of other ways, e.g., by manually turning a crank or handle attached to the disk 30 or by otherwise transferring rotational motion from motor 26 to the disk assembly 30.

A significant feature of the machine illustrated in the drawings is axis of rotation 100 which is offset from horizontal 102 by a first angle 104. The components of the housing 10 are offset from the vertical by a corresponding angle, as is the alignment disk assembly 30, such that the alignment disk 30 tips back slightly as it extends from its bottom to its top.

Figure 6:
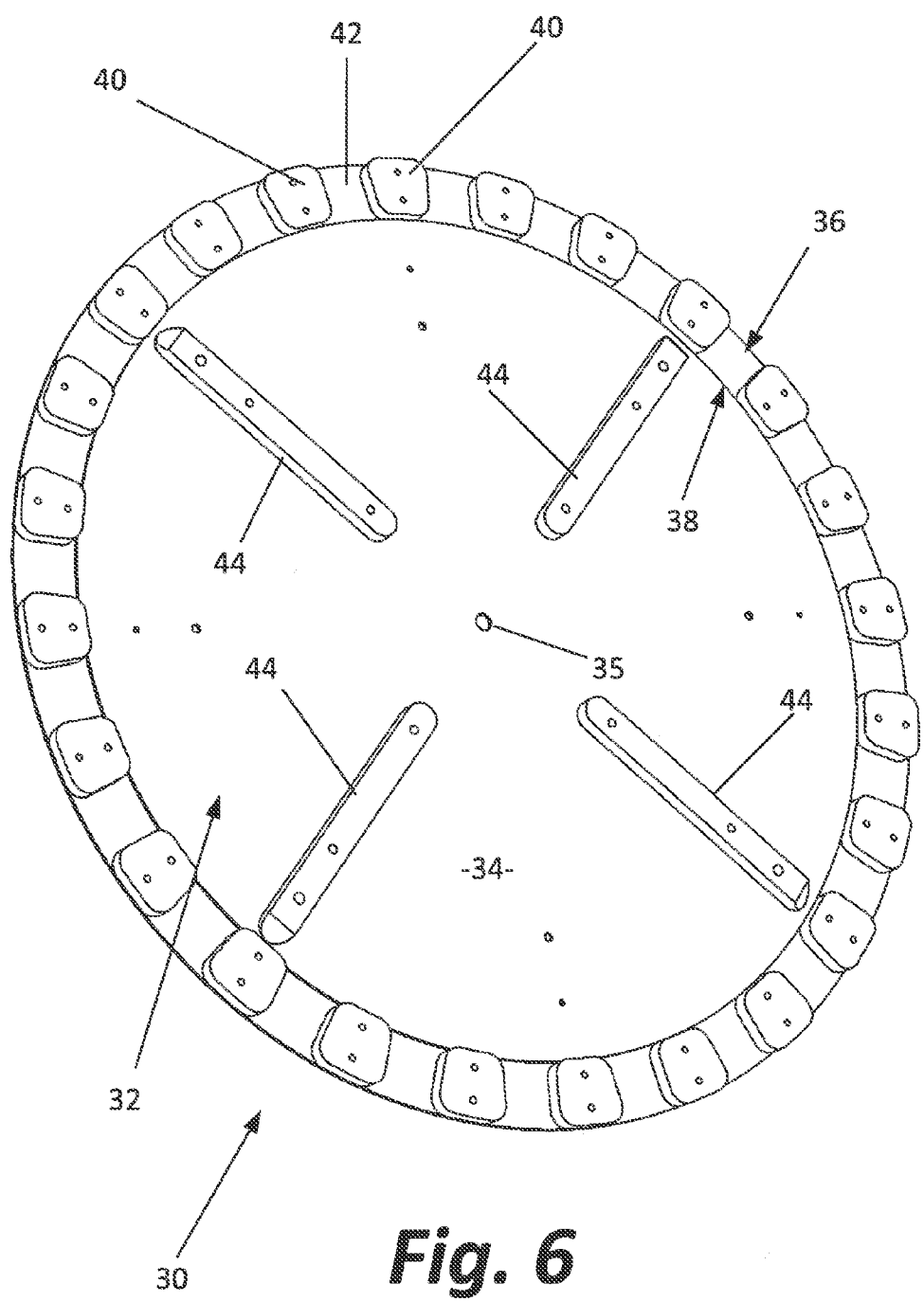
FIG. 6 is a perspective view of the alignment disk assembly of the machine shown in FIG. 1.
Figures 7, 8:
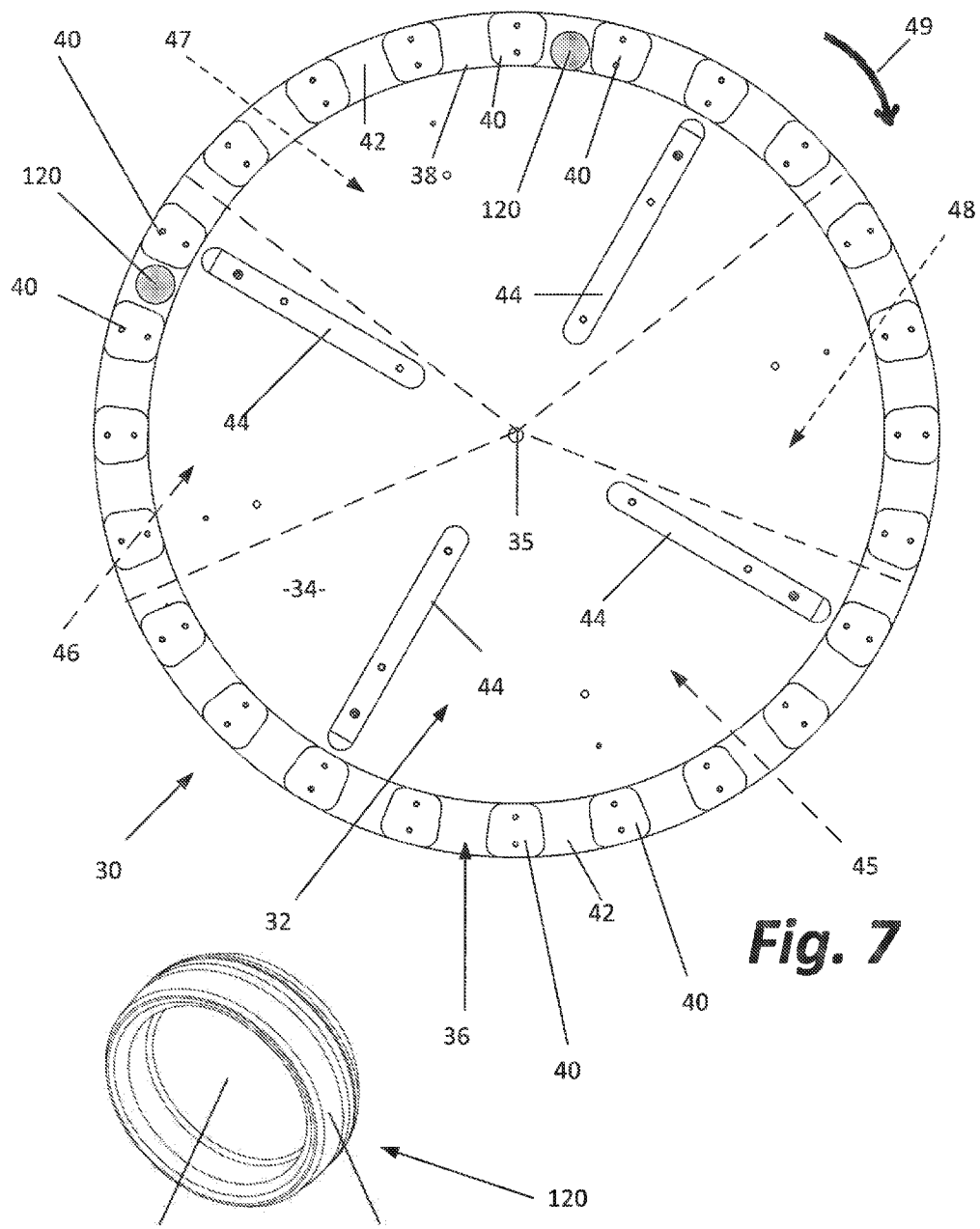
FIG. 7 is a front view of the alignment disk assembly of FIG. 6 with bottle caps seated in two of the pockets of the alignment disk assembly.
FIG. 8 is a perspective view of a bottle cap of a type well known in the prior art.
Figure 11:
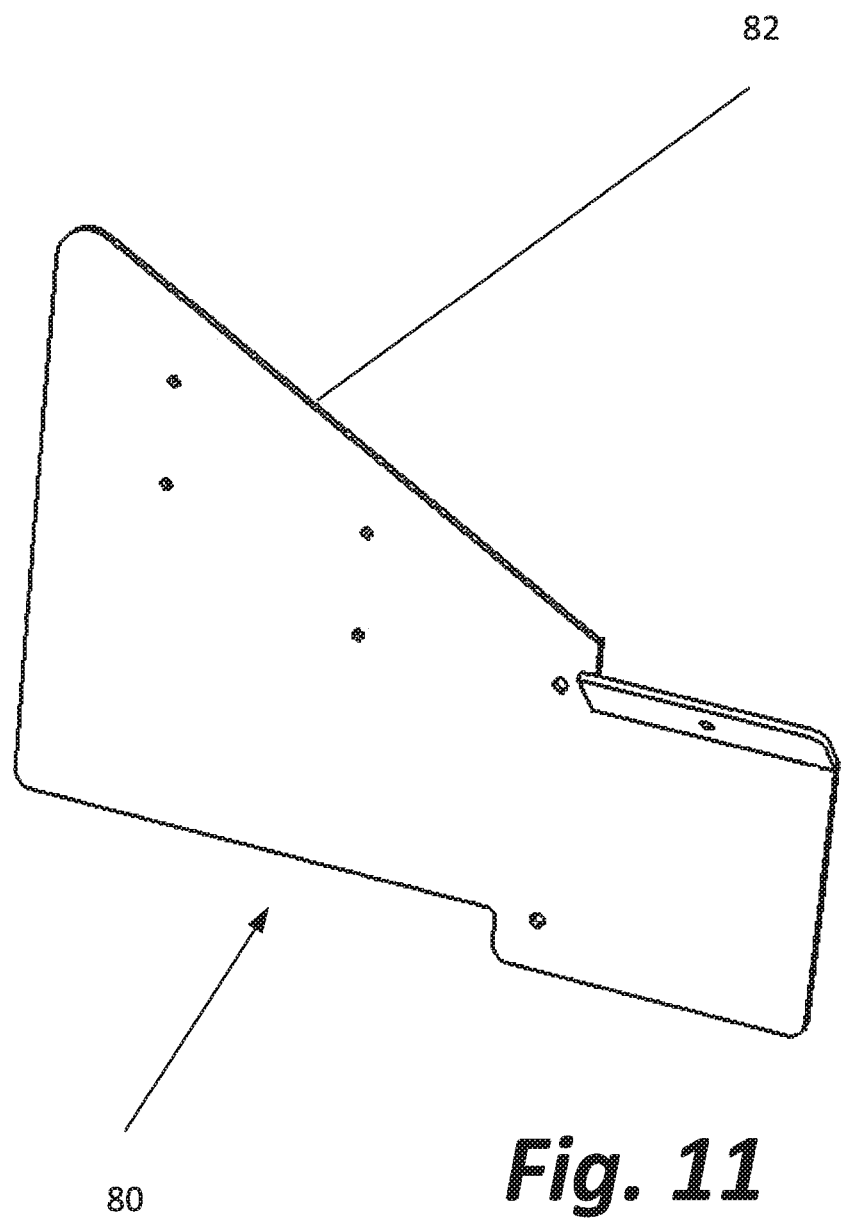
FIG. 11 is a perspective view of the discharge plate of the machine shown in FIG. 1.

The alignment disk assembly 30 is best illustrated in FIGS. 6 and 7. As shown, the alignment disk assembly 30 has a front cap engagement surface 32 and comprises an inner disk member 34 with a center mounting hole 35 and an outer disk member 36. Inner disk member 34 and outer disk member 36 are joined together and offset from each other by a cap support ledge 38 such that the plane of the outer surface of the inner disk member 34 is in front of the plane of the outer disk member 36.

Mounted to the outer disk member 36 is a plurality of flights 40. The flights 40 are generally equally spaced about the outer disk member 36. The distance between the flights 40 depends on the diameter of the caps 120 to be oriented. The distance between the flights 40 should be greater than the diameter of the caps 120 to be oriented and less than twice the diameter of the caps 120 to be oriented.

As shown in the drawings, the flights 40 cooperate with the perimeter of the front cap engagement surface 32 in the area of the outer disk member 36 and the support ledge 38 to form a plurality of pockets 42. In FIG. 7, caps 120 are shown in two of the pockets 42. If the distance between the pair of flights 40 forming a pocket 42 is less than the diameter of the cap 120, the cap 120 will not fit into the pocket 42 as shown. On the other hand, if the distance between a pair of flights 40 forming a pocket 42 equals or is greater than twice the diameter of the caps 120, the possibility of two caps 120 simultaneously entering the pocket 42 and causing a jam exists.

The geometry of the caps to be sorted is used in defining angle 104 discussed above and the distance between the outer disk member 36 and inner disk member 34, i.e., the thickness of the support ledge 38. As illustrated in FIG. 8, cap 120 (illustrative of various types of caps well known in the prior art for capping bottles) includes a round, closed top 122, a cylindrical wall 124 extending from the closed top 122 and an open bottom. This serves to make the cap 120 top heavy. Thus, the thickness of ledge 38 and angle 104 are adapted such that only a single cap 120 will only be retained within the pockets 42 as the alignment disk assembly 30 is rotated if the outside surface of the closed top 122 of the cap 120 faces toward and is generally parallel to the front cap engagement surface 32. If the cap 120 is oriented in any other way in a pocket 42, the cap 120 will fall out of the pocket 42 and back into the cap receptacle 50 as the alignment disk assembly 30 spins before the cap reaches the discharge plate 80. As caps 120 fall from the pockets 42, they come into contact with paddles 44 mounted to the inner disk member 34.

As the disk assembly 30 rotates, the pockets 42 pass through four zones shown in dashed lines in FIG. 7. These include a loading zone 45, an elevator zone 46, a sorting zone 47 and a discharge zone 48. The location of these zones will, of course, change if the disk assembly 30 rotates in the direction opposite of arrow 49 in FIG. 7. Caps 120 are deposited from the cap receptacle 50 into the pockets 42 as they pass through the loading zone. Caps 120 in the pockets 42 are then carried by the flights 40 up and through the elevator zone 46 to the sort zone 47. In the sorting zone 47, properly oriented caps 120 (i.e., caps in the pockets 42 with the closed tops 122 against the front cap engagement surface 32) are retained in the pocket by the ledge 38. All other caps 120 fall out of the pockets 42 and back into the cap receptacle 50. The flights then carry the properly oriented caps 120 to the discharge zone 48 where the caps 120 engage the discharge plate 80 and move down the discharge plate 80 where they exit the apparatus and are moved into a capping machine (not shown).

More specifically, the angle 104 (or more specifically, the axis of rotation 100 of the alignment disk assembly 30) together with the thickness of support ledge 38 are selected so that the center of gravity of a cap 120 oriented with its top 122 against the outer disk member 36 will be over the support ledge 38 when the caps 120 are in the sorting zone 47. Likewise, the center of gravity of any cap 120 not so oriented will be in front of the ledge 38 when the caps 120 are in the sorting zone causing the cap 120 to drop out of the pocket 42 as the disk assembly 30 is rotated.

The foregoing description of the disk assembly 30 may suggest to one of ordinary skill in the art that the various components of the disc assembly are separate pieces. This is not necessarily the case. The inner disk member 34, outer disk member 36 and the cap support ledge 38 may be integrally formed as a single part. Likewise, the entire disk assembly 30 may be integrally formed as a single part having the aforementioned features.

Details concerning the construction of the cap receptacle 50 are illustrated in FIGS. 9 and 10. As illustrated, cap receptacle 50 includes an outer plate 52. Extending from the outer plate 52 is a semi-cylindrical wall 54 forming a trough 56. The trough 56 is sized to accommodate a supply of caps 120 to be oriented. Extending downwardly from the front of semi-cylindrical wall 54 is a curved, toroidal guide plate 58. A support plate 60 extends from the curved, toroidal guide plate 58. The semi-cylindrical wall 54, curved, toroidal guide plate 58 and support plate 60 may be integrally formed and are stationary during a cap sorting operation.

The drawings show the curved, toroidal guide plate extending though an arc of 180 degrees about the axis of rotation of the disk assembly 30. This arc may extend further or shortened. Employing a 180 degree arc will suffice for most applications to allow incorrectly oriented caps to fall back into the trough 56, but adjustments to this arc may be made without deviating from the invention.

Two support structures 62 extend rearwardly and downwardly from the support plate 60. Each support structure 60 has a bore 64 adapted to receive one of the receptacle support rails 18 and 20 of the housing 10 as shown in FIG. 1 to join the cap receptacle 50 to housing 10. The distance of the support plate 60 to the disk assembly 30 is easily adjusted to accommodate caps 120 having different dimensions by sliding the cap receptacle 50 back and forth along rails 18/20. A set screw (not shown) or other suitable locking means may be used to lock the cap receptacle 50 to the rails 18 and 20 at the desired location along the supports rails 18 and 20.

Extending outwardly from the top edges of semi-cylindrical wall 54 are support flanges 66 and 68. Mounted to flange 66 is a backstop 70 which deflects falling caps 120 into the trough 56. The slots 72 in backstop 70 allow adjustment of its position relative to the trough 56 since the fasteners (not shown) which pass through slots 72 have a diameter which is less than the length of the slots 72. A curved plate deflector plate 74 is mounted in a similar fashion to flange 68. The slots 72 in this curved deflector plate 74 permit adjustment of the distance between plate 74 and the disk assembly 30.

When the cap receptacle 50 is mounted to the housing 10 and the disk assembly 30 is rotating, caps 120 in trough 56 will move across the trough 56 toward the curved, toroidal guide plate 58. The caps then move down guide plate 58 and the support plate 60 into the pockets 42 of the disk assembly 30 in the loading zone 45 as the disk assembly 30 spins. When in the pockets 42, the caps 120 are moved by rotation of the disk assembly 30 from the loading zone 45, through the elevator zone 46 and to the sorting zone 47. In the sorting zone 47, as described above, properly oriented caps 120 are retained in the pockets 42 and all other caps fall from the pockets 42 back into the trough 56 of the cap receptacle 50. Caps 120 remaining in the pockets 42 are then transported by rotation the disk assembly 30 to the discharge zone 48. In the discharge zone 48, the correctly oriented caps 120 contact the top inclined edge 82 of the discharge plate 80 and are squeezed out of the pocket 42 such that the caps move down the top inclined edge 82 of the discharge plate 80 and exit the apparatus into a capping machine (not shown).

Those skilled in the art will recognize that various modifications and additions may be made to the device illustrated without deviating from the invention. For example, one or more covers may be added to keep fingers away from and being pinched by the moving parts. These are not shown in the drawing simply to enable one reviewing the drawings to better be able to see the operating features of the machine. Likewise, the size and shape of the trough 56 may be modified. The flights 40, pockets 42 and paddles 44 of the disk assembly 30 may be altered. For example, two interchangeable disk assemblies 30 may be provided, one with larger pockets 42 to accommodate larger diameter caps 120 and another with smaller pockets 42 for smaller diameter caps 120. The angle 104 of the axis of rotation 100 (and the resulting angle of the cap engagement surface 32) may likewise be modified to ensure (a) the center of gravity of properly aligned caps is over (within) the pockets 42 when such caps 120 are in the sorting zone 47 thus holding such caps in the pockets 42 until they reach the discharge zone 48 and discharge plate 80 and the center of gravity of improperly oriented caps is outside and in front of the pockets 42 when such caps reach or are in the sorting zone 47 so such caps are ejected from the pockets 42 and fall back into the cap receptacle 50*t* Other features of the housing 10, disk assembly 30, cap receptacle 50 and discharge plate 80 may also be modified.

The foregoing description is intended to explain the various features and advantages, but is not intended to be limiting. The scope of the invention is defined by the following claims which are also intended to cover a reasonable range of equivalents.

What is claimed is:

1. An apparatus for orienting circular container caps comprising:
   a. a housing;
   b. an alignment disk assembly mounted for rotation within the housing about an axis of rotation angled from the horizontal at a first angle, said alignment disk assembly having (i) a cap engagement surface comprising an inner planar disk member and an outer planar disk member of differing diameter concentrically joined together and offset from each other to define a cap support ledge, (ii) a plurality of flights secured to and projecting outwardly from the outer disk member and having a predetermined circumferential spacing therebetween, (iii) cap support pockets defined by adjacent pairs of said plurality of flights, the outer disk member and the cap support ledge, the predetermined circumferential spacing between the flights of adjacent pairs of flights being greater than the diameter of caps to be oriented and less than twice the diameter of the caps to be oriented, and (iv) a plurality of paddles secured to the inner disk member;
   c. a cap receptacle mounted to the housing and adapted to funnel caps toward the alignment disk; and
   d. a discharge plate mounted to the housing and adapted to redirect caps from the alignment disk, said discharge plate having a top inclined edge;
   wherein when a plurality of caps are loaded into the cap receptacle and the alignment disk assembly is rotating, at least some of the caps enter the pockets of the alignment disk assembly in a loading zone and are carried by such pockets through an elevator zone to a sorting zone, and upon reaching the sorting zone (i) properly oriented caps are carried by the pockets to the discharge zone where they are redirected by the discharge plate such that the caps move down the top inclined edge of the discharge plate and exit the apparatus, and (ii) improperly oriented caps fall from the pockets back into the cap receptacle.

2. The apparatus of claim 1 further comprising a motor for rotating the alignment disk assembly.

3. The apparatus of claim 1 wherein the housing includes at least one cap receptacle support rail and said cap receptacle includes at least one support structure having a bore adapted to receive said support rail for adjustably mounting the cap receptacle to the housing.

4. The apparatus of claim 1 wherein the cap receptacle has an outer plate, a wall forming a trough having an open top and a curved, toroidal guide plate for directing caps from the trough toward the loading zone.

5. The apparatus of claim 4 wherein the curved, toroidal guide plate extends through an arc of 180 degrees about the axis of rotation of the alignment disk assembly.

6. The apparatus of claim 1 wherein said discharge plate had an inclined edge which engages caps in the pockets to redirect the caps.

7. The apparatus of claim 4 wherein said cap receptacle has at least one deflector plate for directing caps falling from the pockets onto the trough.

8. The apparatus of claim 1 wherein said first angle and a thickness of said ledge are adapted so that only properly oriented caps are retained in the pockets passing through the sorting zone.

9. The apparatus of claim 1 wherein said paddles cause at least some of the improperly oriented caps falling from the pockets to tumble as they fall.

10. The apparatus of claim 1 wherein the inner disk member, the outer disk member and the cap support ledge are integrally formed.

11. The apparatus of claim 1 wherein the cap receptacle is stationary.

12. An apparatus for orienting container caps comprising:
a. a housing;
b. an integrally formed alignment disk assembly mounted for rotation within the housing about an axis of rotation angled from the horizontal at a first angle, said alignment disk assembly having (i) a cap engagement surface comprising an inner disk member of a first diameter concentrically joined to an outer disk member of a second diameter greater than said first diameter and the inner and outer disks being offset from each other by a cap support ledge of a predetermined height dimension, (ii) a plurality of flights secured to and about the outer disk member and projecting outward from an exposed surface of the outer disk member, (iii) cap support pockets defined by adjacent pairs of said plurality of flights, the exposed surface of the outer disk member and the cap support ledge, the distance between the flights of adjacent pairs of flights being greater than the diameter of caps to be oriented and less than twice the diameter of the caps to be oriented, and (iv) a plurality of paddles secured to the inner disk member;
c. a cap receptacle mounted to the housing and adapted to funnel caps toward the alignment disk, said cap receptacle having an outer plate, a wall forming a trough having an open top, and a stationary, curved, toroidal guide plate extending in an arc of 180 degrees about the axis of rotation of the disk assembly; and
d. a discharge plate mounted to the housing and adapted to redirect caps from the alignment disk, said discharge plate having a top inclined edge;
wherein when a plurality of caps are loaded into the trough of the cap receptacle and the alignment disk assembly is rotating, at least some of the caps enter the pockets of the alignment disk assembly in a loading zone and are carried by such pockets through an elevator zone to a sorting zone, and upon reaching the sorting zone, due to at least in part to said first angle and the height dimension of said ledge, (i) properly oriented caps are carried by the pockets to the discharge zone where they are redirected by the discharge plate such that the caps move down the top inclined edge of the discharge plate and exit the apparatus, and (ii) improperly oriented caps fall from the pockets back into the trough of the cap receptacle.

* * * * *